March 29, 1966  W. L. BENGER, SR  3,242,914
HEAT EXCHANGER AND COOLING SYSTEM
Filed June 22, 1964
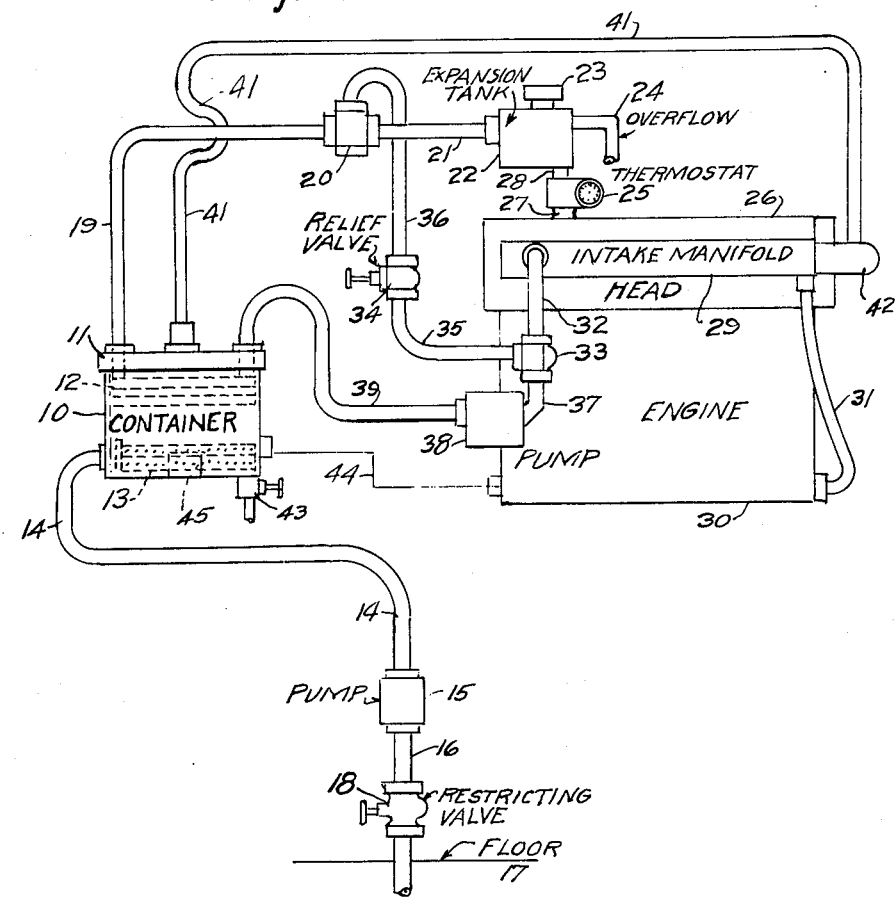
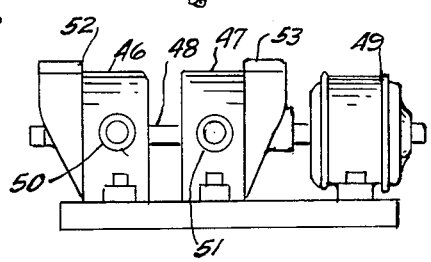
INVENTOR.
WILLIAM BENGER SR.
BY
James Harrison Bowen
ATTORNEY

United States Patent Office

3,242,914
Patented Mar. 29, 1966

3,242,914
HEAT EXCHANGER AND COOLING SYSTEM
William L. Benger, Sr., 4527 19th Ave. S.,
St. Petersburg, Fla.
Filed June 22, 1964, Ser. No. 376,969
1 Claim. (Cl. 123—41.10)

The present invention relates to heat exchangers and cooling systems particularly for regulating the temperature of marine engines by the use of sea water without the sea or salt water coming in direct contact with metal of the engine.

The purpose of this invention is to use sea water for cooling marine engines without deterioration of the metal of the engine.

Various attempts have been made to remove salt from sea water so that sea water may be used for drinking, cooling, and the like. However, conventional methods of removing salt from sea water, particularly by evaporation are very costly, and consequently, all existing cooling systems employing evaporation of sea water are too costly for use in marine engines.

With these thoughts in mind this invention contemplates first using sea water to cool fresh water and then applying the cool fresh water to water jackets of an engine or to radiators thereof.

The object of this invention is, therefore, to provide means for cooling marine engines by sea water wherein the sea water does not make contact with the metal of the engine.

Another object of the invention is to provide means for cooling fresh water in the cooling system of an internal combustion engine by induction or indirect contact of the sea and fresh water.

Another important object of the invention is to provide a cooling system for marine engines in which cool sea water is sprayed over radiators through which fresh water of an engine is circulated.

A further object of the invention is to provide means for reducing the temperature of fresh water of a marine engine cooling system by sea water without modifying the construction of the engine.

A still further object is to provide a heat exchanging and cooling system for marine engines in which the system is comparatively simple and inexpensive.

Other and further objects and advantages of the present invention will be apparent from the following detailed description, drawings and claims, the scope of the invention not being limited to the illustration of the drawings as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

With these and other objects and advantages in view the invention embodies a container having radiators for fresh water therein and perforated tubes providing spray headers for cool or sea water also therein.

The radiators, which are supplied with fresh water, are positioned in the path of spray from the perforated tubes or spray headers, whereby the fresh or hot water from an engine is subjected to cool sea water without mixed therewith.

Other features and advantages of this invention will appear from the following description taken in connection with the drawing, wherein:

FIGURE 1 is a diagrammatic view showing the improved heat exchanger including a container with radiators and spray headers therein, and an internal combustion engine, with suitable connections and operative elements between the parts.

FIGURE 2 is a view illustrating a modification wherein a plurality of pumps are driven by a common shaft and motor.

While one embodiment of the invention is illustrated in the above-referred-to drawings, it is to be understood that they are merely for the purpose of illustration and that various changes in construction may be restorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10 refers to a container having a removable cover 11, numeral 12 indicating radiators suspended from the cover and positioned in the container, numeral 13 referring to perforated tubes mounted in the lower part of the container and providing spray headers which are connected by a tube 14 to a pump 15 the intake of which is connected by a tube 16 to a source of water supply such as the ocean or other body of sea or other water and the discharge of which is connected by the pipe 14 to the perforated headers, numeral 18 designating a restricting valve in the tube 16 and positioned between the pump 15 and floor 17 of a boat.

A tube 19 extends from one end of the radiators 12 to a fitting 20 and the fitting 20 is connected by a tube 21 to an expansion tank 22. The tank 22 is provided with a radiator cap 23 and an overflow 24, and a thermostat 25, which is mounted on the cylinder head 26 by a stud 27 and is connected to the expansion tank by a fitting 28.

The bottom of the intake manifold 29 is connected to the lower part of engine block 30 in the conventional manner such as by a tube 31, and the intake manifold is connected by a tube 32 to a fitting 33 which is connected to a relief valve 34 by a tube 35. The relief valve 34 is connected by a tube 36 to the fitting 20, from which the tubes 19 and 21 extend.

The fitting 33 is connected by a tube 37 to the discharge of a pump 38, and the intake of the pump is connected by a tube 39 to the radiators 12.

The cover 11 is also provided with a connection 41 that extends to an exhaust manifold section 42 of an intake manifold 29 of an engine or motor 30.

The container 10 is provided with a drain valve 43 which is positioned on a lower corner thereof, and the container is connected by a wire 44 to the housing 30 of the engine, providing a ground. A zinc bar 45 is provided in the tank 10 for prevention of electrolysis.

The valve 34 is a spring loaded relief valve, and with the parts arranged as shown, the manifold preheats water that goes to the engine block.

In the arrangement shown in FIGURE 2, pumps 46 and 47, similar to the pumps 15 and 38, are mounted on a common shaft 48, and the shaft is driven by a common motor 49. The pumps 46 and 47 may be provided with intakes 50 and 51, and discharge pipes 52 and 53, respectively. The pumps may also be arranged in any manner desired.

With the parts assembled as illustrated and described fresh water is circulated through the radiator, or radiators 12 and in passing through the radiators the hot water is subjected to the cool sea water from the spray of the perforated tubes 13 whereby heated water from the water jacket of the engine is cooled by the sea water.

The thermostat controls the temperature of the water and when the thermostat closes the relief valve opens preventing excessive pressures.

From the foregoing description, it is thought to be obvious that a heat exchanger and cooling system constructed in accordance with this invention is particularly well adapted for use, by reason of the convenience and facility with which it may be assembled and operated, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:

In a container for sea water, radiators in said container and submerged in said sea water, spray headers for sea water in said container and positioned to spray sea water on said radiators, a connection from the spray headers to sea water supply, a restricting valve in said connection from the sea water to said spray headers, a first pump in said connection between the restricting valve and spray headers, an internal combustion engine having a fluid cooling system, a manifold, a water jacket, and an exhaust, a connection from the radiators to the manifold of said engine, a second pump in said connection between radiators and water jacket of said manifold, a connection from the top of the water jacket of said engine to the radiators in said container, a thermostat for controlling engine heat in said connection between engine and radiators, an expansion tank with filler cap in the connection between the thermostat and radiators, a by-pass connection between the second pump and the manifold, and between the connection between the expansion tank and radiators, a relief valve positioned in said by-pass connection, said relief valve being the control means for water pressure of the second pump when said thermostat closes, and a connection from the top of said container to the exhaust of said engine.

References Cited by the Examiner

UNITED STATES PATENTS

| | | | |
|---|---|---|---|
| 1,313,620 | 8/1919 | Cammen | 115—.5 X |
| 2,062,771 | 12/1936 | Stead | 62—310 X |
| 2,350,598 | 6/1944 | Faville | 165—44 X |
| 2,466,525 | 4/1949 | Wilson | 165—44 X |
| 2,482,024 | 9/1949 | Ortman et al. | 165—51 |
| 2,976,834 | 3/1961 | Waldron et al. | 165—44 X |
| 3,151,471 | 10/1964 | Weil | 62—310 X |

ROBERT A. O'LEARY, *Primary Examiner.*

FREDERICK L. MATTESON, JR., *Examiner.*

M. A. ANTONAKAS, *Assistant Examiner.*